Oct. 8, 1957   D. JOHNSTON   2,808,786
SYSTEM FOR METERING A GASSING LIQUID
Filed May 10, 1954   2 Sheets-Sheet 2

INVENTOR
Douglas Johnston
BY Cushman, Darby & Cushman
ATTORNEYS

United States Patent Office 2,808,786
Patented Oct. 8, 1957

2,808,786
SYSTEM FOR METERING A GASSING LIQUID

Douglas Johnston, Huntsville, Ala., assignor to John Blue Company, Incorporated, Huntsville, Ala., a corporation of Alabama Application May 10, 1954, Serial No. 428,585

4 Claims. (Cl. 103—203)

This invention relates to apparatus for distributing liquids, especially for agricultural purposes. More particularly, this invention pertains to a system for metering gassing liquids for application to the soil for agricultural purposes.

In the fertilizing of crops, nitrogen solutions are becoming of increasing importance. Such liquids usually consist of an aqueous solution of anhydrous ammonia and ammonium nitrate, or a similar water-soluble nitrogenous fertilizer. While the soluble fertilizer enables the solution to hold more ammonia than plain water, in practical usage the ammonia tends to vaporize to some extent, particularly at the operating temperatures to which such solutions are exposed during distribution.

Apparatus for soil application of solutions of the above character usually includes a large supply tank for the solution, and a plurality of elongated thin soil-working tools, usually termed "applicator blades," which have an integral passageway or a conduit secured thereto and extending to the foot thereof. The solution is conducted from the tank to the foot of the blade through such passageway or conduit for discharge and absorption into the soil. For agricultural reasons and because such solutions are relatively expensive, it is essential that the application rate or quantity of solution discharged per unit area of the soil be accurately adjustable.

Mechanism for controlling the application rate of such solutions to the soil, i. e., metering mechanism, has, in the past, included such instrumentalities as metering valves used in conjunction with flow meters, and also variable-delivery metering pumps driven by a ground-engaging wheel of a tractor or a trailer-type vehicle on which the solution supply tank and the pump are mounted. In actual practice, however, application apparatus is exposed to the heat of the sun, with a resulting temperature rise of both the solution in the supply tank and the solution in the various hose connections leading from the supply tank to the application-rate-controlling mechanism. Such temperature rise causes gassing of the solution, so that gas bubbles will be present in the liquid entering the metering mechanism, and it is impossible to accurately meter a solution consisting of a mixture of a gas and a liquid. Further, if gassing of the liquid becomes excessive and a pump is used for metering purposes, the pump may become gas or vapor-bound and fail to pump liquid at all.

Accordingly, it is an object of this invention to provide an improved system for accurately metering a gassing liquid for application to the soil.

It is another object of this invention to provide an improved system including a variable delivery metering pump for accurately metering a gassing liquid.

It is another object of this invention to provide a system of the type described which precludes the passage of vapor through a metering pump.

It is another object of this invention to provide relatively simple and inexpensive apparatus for accomplishing the foregoing objects.

Other objects and advantages of the invention will become apparent from the following description and accompanying drawings, in which.

Figure 1:
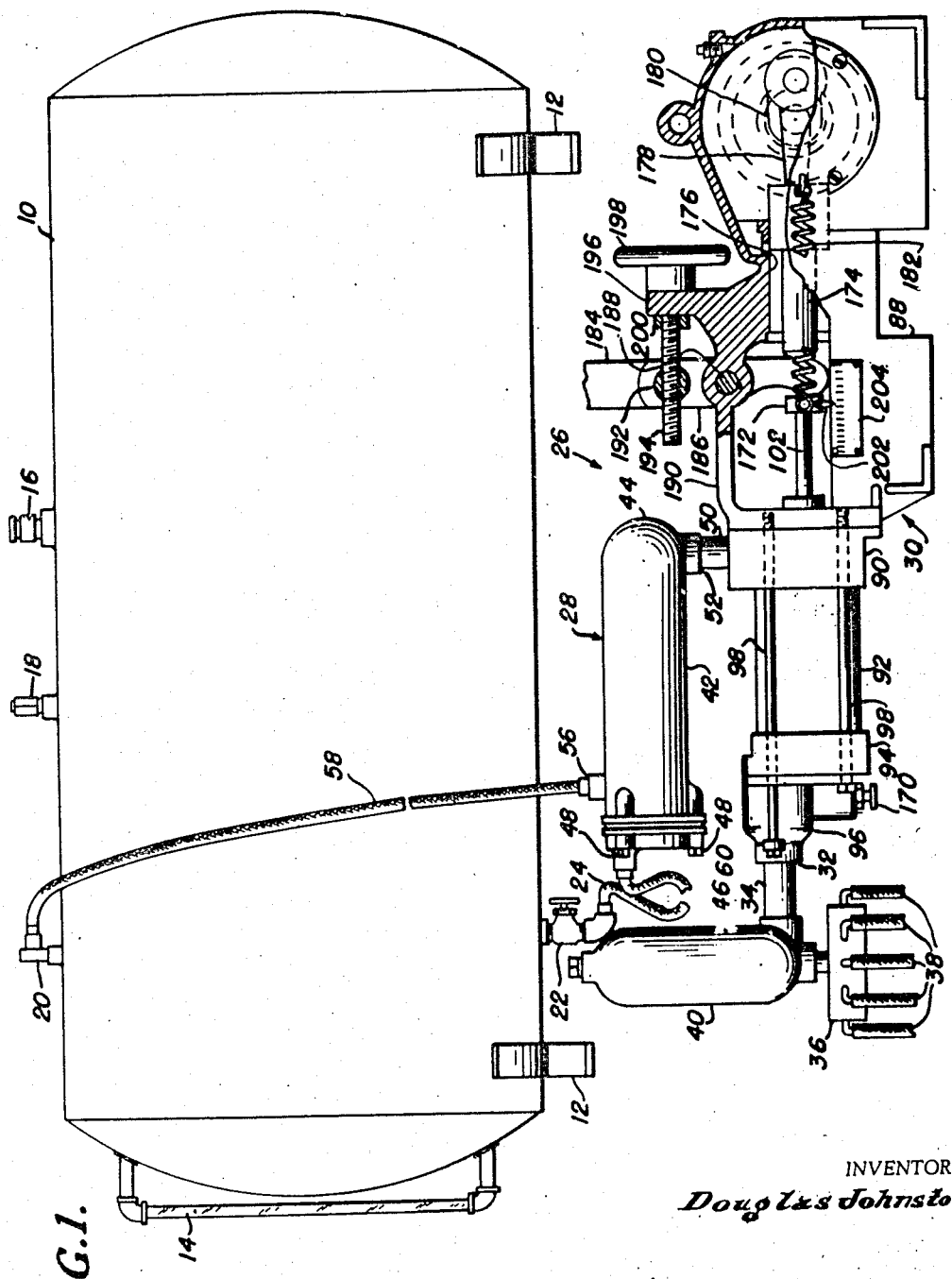
Figure 1 is an elevational, partially schematic, partly sectional view of a system for distributing and accurately metering gassing liquids in accordance with this invention.

Referring now to the drawings, there is shown in Figure 1 a conventional supply tank 10 for nitrogen solutions. The tank 10 is in the form of an elongated cylinder having convex ends and brackets 12 for mounting the tank horizontally on a tractor or a trailing type of vehicle (not shown). At one end of the tank 10 there may be provided a conventional glass sight gauge 14, and on the top of the tank is a filler valve 16, a combined vacuum breaker and bleeder valve 18, and a combined pressure relief valve and vapor return connection 20, as will be later explained. At the bottom of the tank 10 is a valved outlet 22 having a hose 24 connected thereto for withdrawing solution from the tank and passing the same through metering mechanism 26 to applicator blades (not shown). The mechanism 26 for accurately metering the solution at an adjustable rate consists of a gas separator 28 mounted on top of a variable-delivery positive-displacement metering pump 30 which is adapted to be mounted horizontally on the tractor or other vehicle. The discharge outlet 32 of the pump is connected via a line 34 to a manifold 36 from which a plurality of hoses 38 divide and conduct the metered solution to applicator blades (not shown). The discharge line 34 leading from the pump 30 to the manifold 36 may also desirably include a surge chamber 40 to smooth out the flow of the solution from the manifold and provide a non-pulsating discharge from the applicator blades.

The gas separator 28 consists of an elongated cylindrical vessel 42 closed at one end thereof by an integral rounded end 44 and at the other end thereof by a detachable appropriately-gasketed closure plate 46 secured to the separator by cap screws 48. The separator 28 is mounted horizontally on top of the metering pump 30 by a short vertical connecting nipple 50 which engages an interiorly-threaded outlet 52 in the bottom of the separator adjacent its integral end 44 and an interiorly-threaded inlet 54 in the top of the pump. A gas outlet 56 is provided in the top of the separator 28 and is connected to the vapor return connection 20 on the tank 10 by a flexible conduit or hose 58. The pump 30 and separator 28 are mounted on the vehicle so that the gas outlet 56 is on a level below the bottom of the tank 10. The hose 24 from the valved outlet 22 at the bottom of the tank 10 is connected to an inlet 60 in the upper part of the closure plate 46 of the separator 28.

It thus will be seen that in operation the solution flows from the tank 10 through the hose 24 into the separator 28. Any gas or gas bubbles in the solution entering the separator 28 will rise therein and separate from the liquid and will return, via the conduit 58, to the gas space above the liquid in the tank 10. At the same time, a head of degassed liquid will be maintained in the separator 28 and in the short vertical nipple 50 leading to the suction inlet 54 of the pump 30. Thus, positioning of the separator 28 immediately above the pump 30 to achieve gas separation immediately before the solution is fed to the pump precludes passage of gas or gas bubbles therethrough, so that only liquid is passed through the pump to assure accurate metering of the solution. As stated above, the pump 30 and the separator 28 are mounted on a tractor or on a trailer-type vehicle, so that the gas outlet 56 of the separator 28 is on a lower level than the outlet 22 from the bottom of the supply tank 10, so that a gravity feed to the pump will be had at all times irrespective of the liquid level in the tank.

The system illustrated and described thus far can also be used for accurately metering a pressurized normally-gaseous liquid, e. g., anhydrous ammonia, which readily vaporizes at ambient temperatures. By the use of the separator 28, the gaseous component will be readily separated from the liquid component of such liquids to assure that only liquid is passed through the pump 30 for accurate metering.

Figure 2:
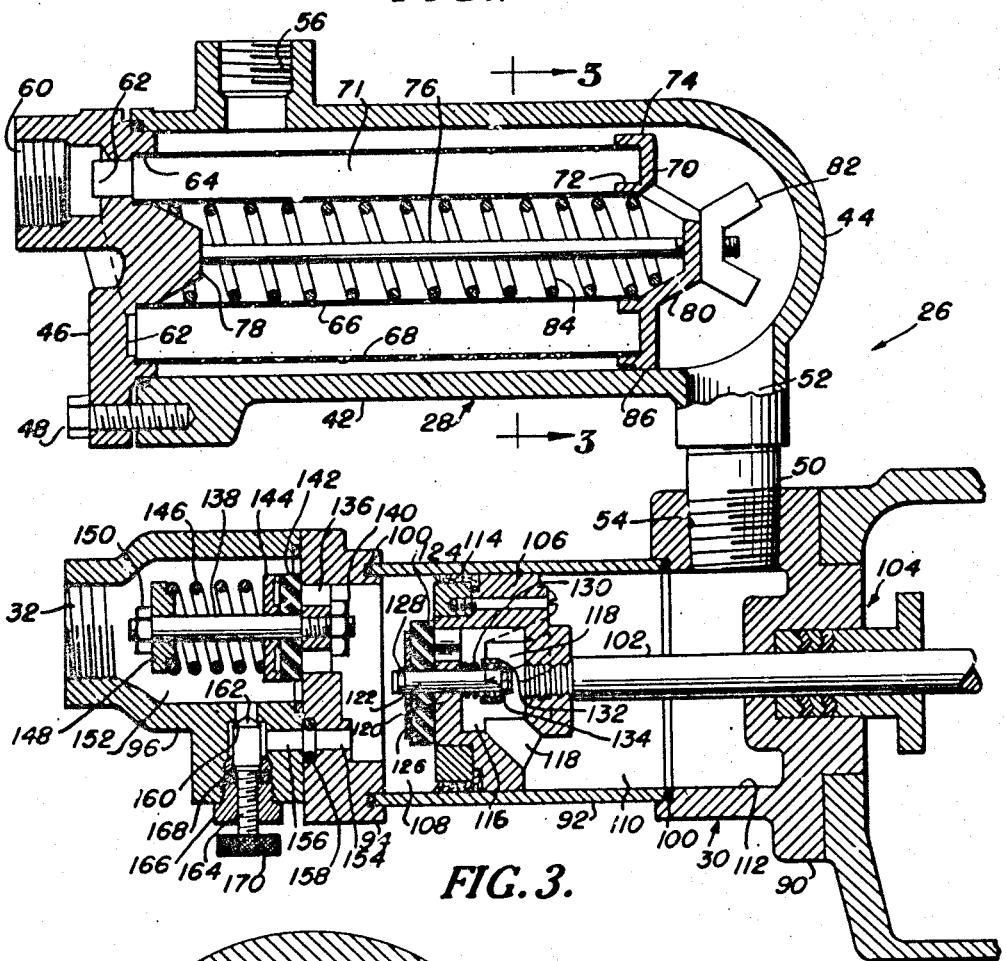
Figure 2 is an enlarged longitudinal vertical sectional view through the metering pump and gas separator shown in Figure 1.
Figure 3:
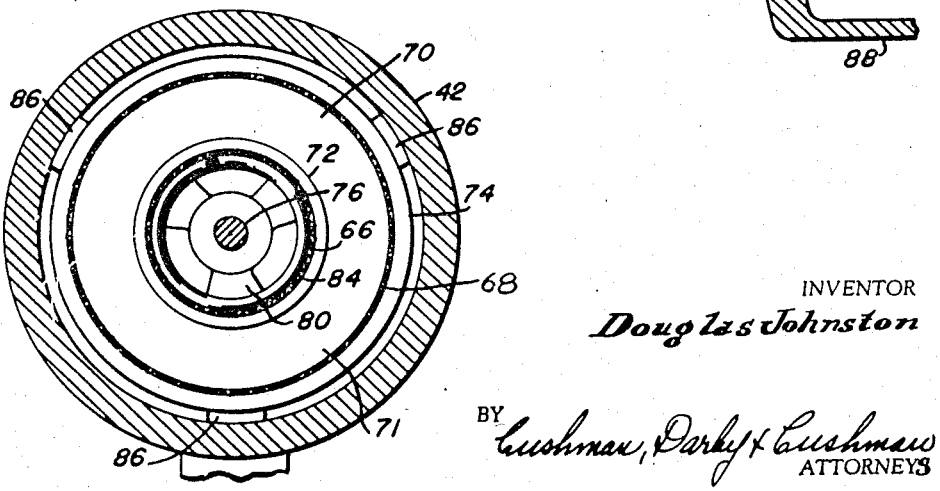
Figure 3 is an enlarged transverse sectional view taken substantially on line 3—3 of Figure 2.

The inner side of the closure plate 46 is provided with a relatively-wide annular groove 62 having the inlet 60 opening to the bottom thereof. Preferably, the groove 52 is deepest at the inlet 60 and progressively becomes shallower toward the lower part of the closure plate 46, as shown in Figure 2. Positioned in a groove countersink 64 of uniform depth and respectively engaging the inner and outer side walls thereof are the ends of a pair of inner and outer concentric cylindrical screens 66 and 68. The other ends of the screens 66 and 68 are engaged by an annular plate 70 which closes the annular space 71 therebetween. Preferably, the plate 70 has inner and outer axially-extending peripheral flanges 72 and 74 for engagement with the outer sides of the inner and outer screens 66 and 68, respectively. A rod 76 extends centrally from a central boss 78 on the inner side of the closure plate 46 through the inner screen 66 and through a central aperture in a spider 80 in the plate 70. A wing nut 82 is threaded on the end of the rod 76 to firmly hold the plate 70 against the ends of the screens 66 and 68 and retain the latter in their proper position with the separator 28. Preferably, a coiled compression spring 84 is positioned within the inner screen 66 to bear against the boss 78 and the spider 80 to somewhat resist tightening of the wing nut 82 sufficiently to tend to collapse or damage the screens. A plurality of circumferentially-spaced radially-outwardly-extending lugs 86 are provided on the plate 70 so that the periphery of the same and of the outer screen 68 will be spaced from the inner surface of the separator 28.

It thus will be seen that liquid, or a mixture of gas and liquid, entering the separator 28 through the inlet 60 will flow into the groove 62 and thence be evenly distributed into the annular space 71 between the inner and outer screens 66 and 68. The fluid in such space 71 must flow outwardly through the outer screen 68 or inwardly through the inner screen 66 and thence through the spider 80 before the liquid and/or gas can pass either through the gas return outlet 56 or the liquid outlet 52 of the separator 28. Since nitrogen solutions usually contain a quantity of undissolved salts or other trash which might damage or cause leakage of the pump valves, later described, the combining of a strainer with the separator is a desirable feature.

The pump 30 includes a crankcase structure or housing 88 (similar to that shown in the copending application of John Blue, Serial No. 80,957, filed March 11, 1949, Patent No. 2,696,785) on one end of which are secured a stuffing box plate 90, a horizontal relatively-thin-walled pump cylinder 92, a cylinder head 94, and a discharge housing 96, in the order stated. These parts are secured together by a plurality of long cap screws 98 which extend through apertures or apertured ears in the discharge housing 96, through aligned apertures in the cylinder head 94 and the stuffing box plate 90, exteriorly and longitudinally of the cylinder, and into threaded apertures in the end of the crankcase housing 88. Appropriate gaskets 100 are interposed between the cylinder 92 and its head 94 and the stuffing box plate 90. A piston rod 102 extends through a central conventional gland-type stuffing box 104 in the stuffing box plate 90 and has a piston or pump plunger 106 threaded on the inner end thereof to divide the cylinder 92 into a pumping chamber 108 and an inlet chamber 110. The stuffing box plate 90 has a central circular recess 112 on its inner side coaxial with and of the same diameter as the cylinder 92. The pump inlet 54 extends vertically through the top wall of the recess 112, so that any gas formed in the pump inlet chamber 110 will rise upwardly through the nipple 50 to the separator 28 without being trapped in the pump inlet chamber.

The piston 106 has a conventional cup washer 114 and also is provided with a central cylindrical recess 116 in its forward end in open communication with the inlet chamber 110 via a plurality of rearwardly-inclined radial passageways 118. At the forward end of the piston recess 116 is a spider 120 having a valve stem 122 slidable centrally therethrough. A resilient valve washer 124 backed by a metal disc 126 retained by a snap ring 128 is mounted on the outer end of the valve stem 122 in position to seat against the forward end of the piston 106 and completely close the forward end of the recess 116 therein. The valve washer 124 is urged to seat by a light coil compression spring 130 which bears against the inner side of the spider 120 and against a spring retainer washer 132 held on the inner end of the valve stem 122 by a snap ring 134.

A circular array of valve ports or orifices 136 extend through the upper portion of the cylinder head 94, so that the upper side of the uppermost valve orifice 136 is substantially on the same level as the interior surface of the upper side of the cylinder 92. A valve stud 138 is threaded into the cylinder head 94 at the center of the circular array of valve orifices 136 and is secured in place by a nut 140 on the inner end of the stud. Reciprocable on the stud 138 to seat on the cylinder head 94 and close the orifices 136 is a resilient valve washer 142 backed by a metallic valve disc 144. The valve disc 144 and washer 142 are urged to seat by a relatively-heavy coil compression spring 146 surrounding the valve stud 138 and having its outer end engaged by a spring-retainer washer 148 that is secured on the stud by a nut 150 threaded onto the outer end thereof. Since nitrogen solutions containing ammonia sometimes develop considerable pressure by gassing when confined, the spring 146 of the pump discharge valve must be strong enough to withstand such gas-developed pressure. It also will be noted that, since the upper side of the uppermost discharge valve orifice 136 is substantially on the same level as the interior of the upper side of the cylinder 92, substantially no gas can be trapped in the pumping chamber 108 on the pumping stroke of the piston 106.

The interior of the discharge housing 96 is enlarged to form a discharge chamber 152 for the accommodation of the valve washer 142, spring 146, stud 138, etc., and has the threaded discharge outlet 32 for connection to the discharge line 34 leading to the manifold 36. An aperture or passageway 154 in the cylinder head 94 spaced from the orifices 136 is aligned with one end of a passageway 156 in the discharge housing 96 that has a right-angle bend therein and leads to the discharge chamber 152. Appropriate gasketing 158 between the cylinder head 94 and the housing 96 seals the junction of the passageways 154 and 156. Included in the passageway 156 is a valve seat 160 with which a conical valve head 162 cooperates to control the passageway 156. The valve head 162 has a stem 164 threadedly engaged in a follower gland 166 for a stuffing box 168 and has a knurled head 170 on the outer end thereof for manual adjustment. This valve can be opened to purge the pumping chamber 108 of any gas under pressure therein before the start of a pumping operation.

The drive of the pump is also similar to the aforementioned application and includes a crossbeam 172 on the outer end of the piston rod 102 adapted to be contacted and intermittently pushed inwardly of the pumping chamber 108 by a crosshead assembly 174 reciprocable in a bore 176 in the crankcase housing 88 by a connecting rod 178 and a crankshaft 180. The crankshaft 180 is journalled in the crankcase housing 88 and has driven connection with a ground-engaging wheel (not shown) of the vehicle on which the pump is carried. Hence, the rate of rotation of the crankshaft 180 depends upon the speed of the vehicle, so that the rate of application or quantity of liquid applied per unit area to the soil remains a constant for any setting of the pump (as later explained) irrespective of the speed of the vehicle.

While the pumping stroke is effected by the crosshead assembly 174, the suction or return stroke of the pump is effected by a pair of coil tension springs 182, one on each side of the crankcase housing 88 and having one end thereof connected to the corresponding side of the crossbeam 172 and the other end thereof connected to a remote portion of the corresponding side of the crankcase housing. The length of the suction or rearward stroke of the piston rod 102, and hence the length of the pumping stroke, are adjusted and controlled by means of a forked lever 184 having the two legs 186 thereof mounted on a pivot pin 188 extending transversely through a longitudinal upper bridge member 190 on the crankcase housing 88. The rounded lower ends of the legs 186 of the lever 184 straddle the crosshead assembly 174 and engage against the crossbeam 172 inwardly of the springs 182 to limit outward travel of the piston rod 102. A transverse pin 192 journalled in the two legs 186 of the lever 184 has threaded engagement with a longitudinally-extending screw 194 which extends loosely through an upstanding lug 196 on the crankcase housing 88 and has a handwheel 198 secured thereon. Preferably, a lock nut 200 is also threaded onto the screw 194. Accordingly, the relative position of the lever 184 can be adjusted and maintained by the handwheel 198 to adjust the delivery of the pump. Preferably, a pointer 202 on one end of the crossbeam 172 cooperates with a scale 204 on the crankcase housing 88 to indicate, at the end of the suction stroke of the pump, the delivery setting of the latter.

It thus will be seen that the objects of the invention have been fully and effectively accomplished. It will be realized, however, that the specific embodiment shown and described for the purpose of illustrating the principles of the invention is subject to change without departure from such principles. Therefore, this invention includes all modifications encompassed within the spirit and scope of the following claims.

I claim:

1. A gas separator for use in conjunction with a positive displacement pump in the metering of a gassing liquid comprising: an elongated closed vessel adapted for horizontal disposition immediately above the pump and having an upper gas return outlet and a lower liquid outlet; a detachable closure for one end of said vessel; a pair of nesting tubular screens extending from said closure into said vessel, one end of said screens being closed by said closure and the larger of said screens being spaced from the walls of said vessel, said screens being radially spaced to provide a space therebetween; means engaging the other end of said screens and closing said space therebetween; and an inlet in said closure in unobstructed communication with said space between said screens.

2. A pump for metering a gassing liquid comprising: a cylinder adapted to be mounted horizontally and having at least one closed end; a plunger reciprocable in said cylinder and defining with said cylinder and said end wall a pumping chamber; an outlet check valve in the upper portion of said cylinder end wall, said valve having an orifice on a level substantially flush with the inner side of the uppermost portion of said cylinder, whereby gas cannot be trapped in said chamber; and a manually-controllable valved by-pass passage between said pumping chamber and the discharge side of said outlet check valve.

3. In a system for metering a gassing liquid, the combination comprising: a supply tank for the liquid; a separator having an inlet, a liquid outlet in a lower portion thereof, and a gas outlet in an upper portion thereof; a positive displacement reciprocating pump including a horizontal cylinder having an inlet in an upper portion thereof positioned immediately beneath said separator liquid outlet; liquid supply conduit means connecting a lower portion of said tank to said separator inlet; gas return conduit means connecting said separator gas outlet to an upper portion of said tank; and liquid feed conduit means connecting said separator liquid outlet to said pump inlet, said separator comprising means defining an elongated horizontal chamber having one open end; a closure for said end; a pair of nesting tubular screens in said chamber, one of larger cross section than the other to provide a space therebetween; and means closing the ends of said space, the separator inlet being in unobstructed communication with said space.

4. In a system for metering a gassing liquid, the combination comprising: a supply tank for the liquid; a separator having an inlet, a liquid outlet in a lower portion thereof, and a gas outlet in an upper portion thereof; a positive displacement reciprocating pump including a horizontal cylinder having an inlet in an upper portion thereof positioned immediately beneath said separator liquid outlet; liquid supply conduit means connecting a lower portion of said tank to said separator inlet; gas return conduit means connecting said separator gas outlet to an upper portion of said tank; and liquid feed conduit means connecting said separator liquid outlet to said pump inlet, said pump comprising a horizontal cylinder having closed ends, a valved plunger reciprocable therewithin and defining therewith and with said ends an inlet chamber and a pumping chamber, the pump inlet being located in an upper portion of the fixed wall of said inlet chamber, and an outlet check valve for said pumping chamber located in an upper portion of the fixed wall of said pumping chamber.

References Cited in the file of this patent

UNITED STATES PATENTS

| | | |
|---|---|---|
| 814,883 | Starr | Mar. 13, 1906 |
| 942,368 | Dyer | Dec. 7, 1909 |
| 1,290,803 | Thoens | Jan. 7, 1919 |
| 1,870,734 | Jennings | Aug. 9, 1932 |
| 1,941,390 | De Lancey | Dec. 26, 1933 |
| 1,957,418 | Willson | May 1, 1934 |
| 2,020,112 | Fagan | Nov. 5, 1935 |
| 2,237,520 | Brubaker et al. | Apr. 8, 1941 |
| 2,415,571 | Yuza | Feb. 11, 1947 |
| 2,423,439 | De Lancey | July 8, 1947 |
| 2,693,196 | Hundley | Nov. 2, 1954 |
| 2,696,785 | Blue | Dec. 14, 1954 |